United States Patent [19]

Flisch

[11] 4,194,420
[45] Mar. 25, 1980

[54] AUTOMATIC BAR-LOADING APPARATUS FOR A MULTI-SPINDLE AUTOMATIC LATHE

[75] Inventor: Hermann Flisch, Maienfeld, Switzerland

[73] Assignee: Eunipp AG, Zug, Switzerland

[21] Appl. No.: 12,229

[22] Filed: Feb. 14, 1979

[30] Foreign Application Priority Data

Feb. 23, 1978 [DE] Fed. Rep. of Germany ....... 2807771

[51] Int. Cl.² .............................................. B23B 15/00
[52] U.S. Cl. ......................................................... 82/2.7
[58] Field of Search ................................ 82/2.5, 2.7, 3

[56] References Cited

U.S. PATENT DOCUMENTS

| | | |
|---|---|---|
| 3,874,519 | 4/1975 | Mikami .................................... 82/2.7 |
| 3,955,687 | 5/1976 | Flisch ...................................... 82/2.7 |
| 4,068,545 | 1/1978 | Scheler ................................... 82/2.7 |
| 4,088,230 | 5/1978 | Doe et al. .............................. 82/2.7 |

Primary Examiner—Harrison L. Hinson

[57] ABSTRACT

The apparatus has a loading drum 3 with rod guide tubes 31, a rod magazine 4, and a rod separator apparatus 5. In order to permit the rod stock of the openable guide tubes 31 to be fed in more than one spindle position, there are provided arms 9 and bails 11 for the rod magazine 4, the separator 5, and the motor 6 of a rod feeding apparatus. The arms 9 and bails 11 are pivotable about a common longitudinal traverse 10 and can be locked in various chosen positions A, B by means of a rod 13 passing through all the arms 9, the bails 11 and through in each case one of a plurality of bores 12', 12", 12'''.

2 Claims, 5 Drawing Figures

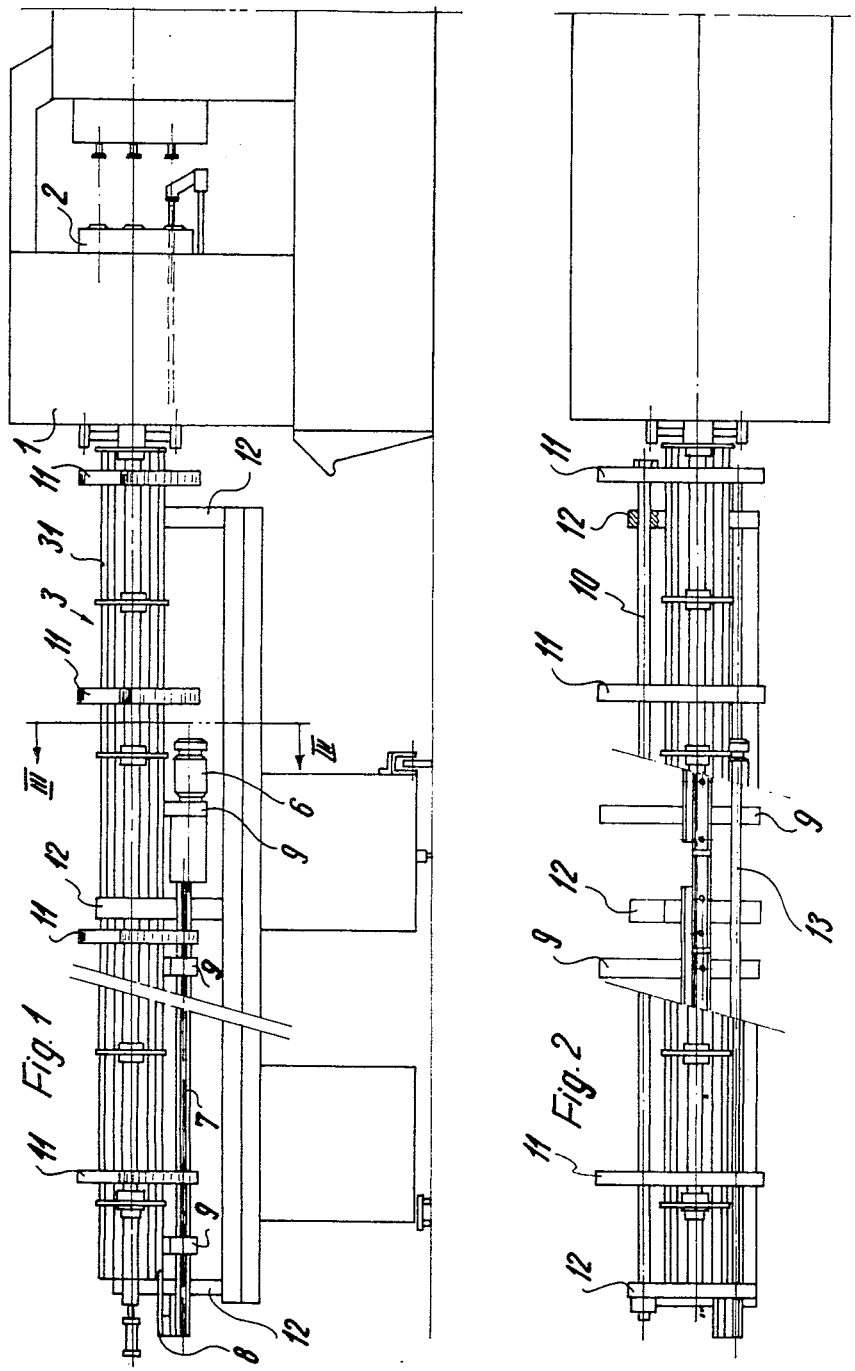

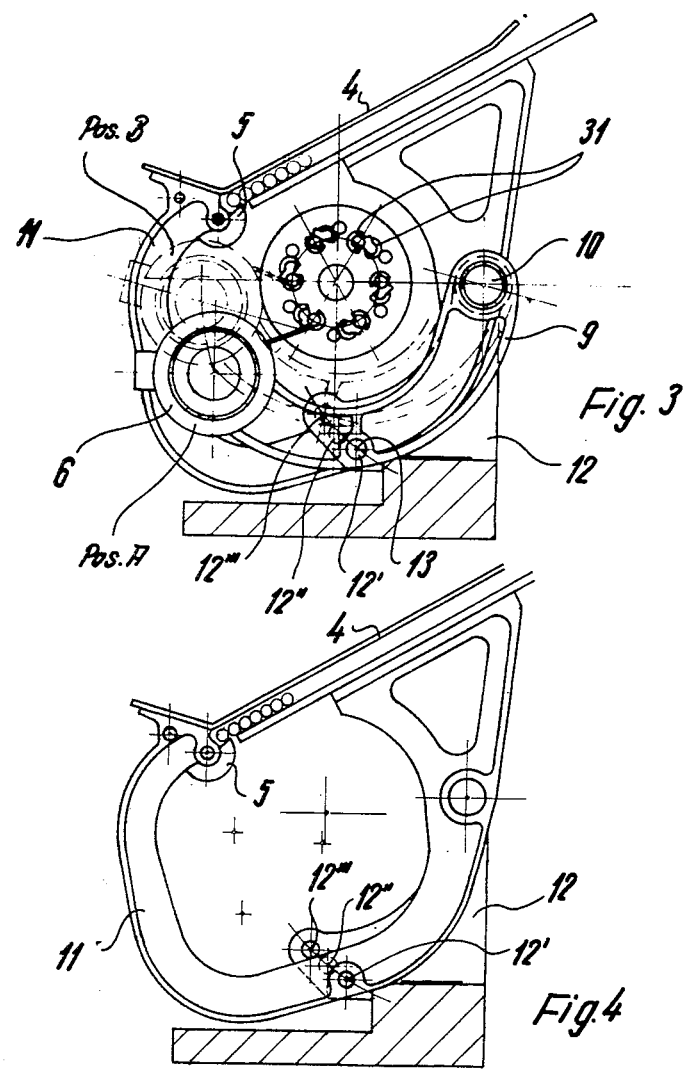
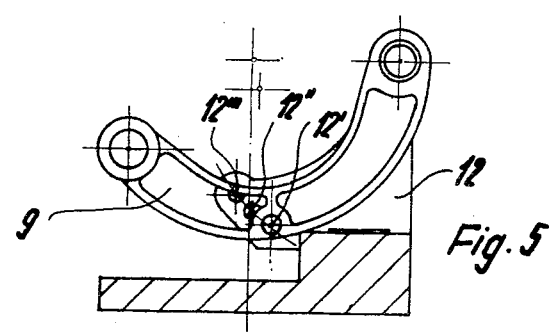

AUTOMATIC BAR-LOADING APPARATUS FOR A MULTI-SPINDLE AUTOMATIC LATHE

BACKGROUND OF THE INVENTION

One type of apparatus for automatically loading bars into a multi-spindle automatic lathe is described in the German Pat. No. 2,063,075. In this apparatus, a bar separating device and a feed device have a fixed association with a particular spindle position, so that the supplying of the bar stock and the bar feeding can be carried out only in this one spindle position.

A further bar-loading apparatus for a multi-spindle automatic lathe is described in the German Pat. No. 2,401,064. Here there is a bar feeding device in fixed association with each bar guide tube, and therewith with each spindle. This type of apparatus, however, is very complex and costly.

It is an object of the invention to provide an automatic bar-loading device for a multi-spindle automatic lathe which can be manufactured without excessive manufacturing costs and which makes possible without change in the construction of the apparatus itself or of the automatic lathe the supplying of the bar stock to the openable guide tubes as well as the bar stock feeding in different spindle positions.

SUMMARY OF THE INVENTION

With the novel apparatus in accordance with the present invention, there are provided carrier arms for the rod magazine, the rod separating apparatus, and the rod feeding apparatus. These arms pivot about a common traverse, which is fixed outside the pivot circle of the rod guide tubes and runs parallel to these tubes, so that it can be locked in various angular positions.

Through this design of the rod supply apparatus, it is made possible to supply the rod stock to the guide tubes in different spindle positions by means of one and the same separating apparatus and to advance them in the guide tubes and the hollow spindles in the same spindle position by means of one and the same feeding apparatus.

BRIEF DESCRIPTION OF THE DRAWINGS

FIG. 1 is a front view of an automatic bar-feed apparatus in accordance with the present invention adjacent a portion of an automatic lathe, shown schematically, which receives bar stock fed into it by the apparatus.

FIG. 2 is a partially sectioned top view of the apparatus of FIG. 1.

FIG. 3 is a cross-sectional view of the apparatus of FIG. 1 taken through the section line III—III.

FIG. 4 shows separately certain individual parts of the apparatus of FIG. 1 which are also shown in FIG. 3.

FIG. 5 shows separately some additional parts of the apparatus of FIG. 1 and FIG. 3.

DESCRIPTION OF THE PREFERRED EMBODIMENT

FIG. 1 illustrates an apparatus in accordance with the present invention. In the stand 1 of a multi-spindle rod-type automatic lathe there is arranged a spindle drum 2 which is rotatable on bearings and which has six spindles arranged in a circle. Behind the spindle drum 2 there is a rod loading apparatus. This apparatus consists of a loading drum 3 arranged coaxially with the spindle drum 2 and angularly fixed therewith in a known manner. The loading drum 3 has six openable guide tubes 31 which line up with the spindles of the lathe and are divided longitudinally. The loading drum 3 further has a rod magazine 4, a rod separating apparatus 5, and an apparatus for feeding the rod stock in the guide tubes 31. This feeding apparatus has a motor 6, and endless chain 7, and a feed dog 8. The latter extends into a lengthwise slot of a guide tube 31. With the motor 6 running, the feed dog 8 acts to advance the rod stock in the guide tube 31.

The above described rod supply apparatus is in accordance with the invention arranged on sickle-shaped curved arms 9. The arms 9 are pivotally supported on a traverse 10, which is outside the pivoting circle of the rod-guiding tubes 31, is held fixed by brackets 12, and is parallel to the rod guiding tubes 31. The arms 9 rest against bails 11, which likewise are pivotably supported on the traverse 10 and carry the rod magazine 4, as well as the rod separating apparatus 5.

In the brackets 12 are three bores 12', 12", and 12''' which are evenly spaced from the traverse 10. The arms 9 and the bails 11 further each have a further bore in the regions of the mentioned bores. A rod 13 is passed through bores of all arms 9 and all bails 11, as well as through the bores 12', 12", 12''' of the brackets 12. The arms 9 and the bails 11 are thereby fixed in the desired position relative to the brackets 12. By means of this arrangement, it is possible as desired to associate with a given one of two neighboring spindle positions the rod magazine 4, the rod separator apparatus 5, and the rod feeding apparatus 6, 7,8 (compare FIG. 3, pos. A and pos. B).

I claim:

1. Apparatus for automatically loading rods for feeding to a multi-spindle automatic lathe, the apparatus being of the type having a loading drum arranged coaxially with a spindle drum and angularly fixed therewith, the loading drum having a number of guide tubes, corresponding to the number of spindles and aligned with the spindles; a rod magazine; a rod separator apparatus; and, a feeding apparatus for the rod stock in the guide tubes and the spindles, which are provided with feeding jaws; the improvement therein comprising:
   a traverse rod (10) fixed parallel to the guide tubes,
   bails (11) and arms (9) pivotably supported by the traverse (10), the bails (11) and arms (9) carrying the rod magazine (4), the rod separator apparatus (5), and the rod feeding apparatus (6,7,8), and
   means for fixing the bails (11) and arms (9) in a chosen angular position.

2. The apparatus of claim 1, wherein the traverse (10) is supported by brackets and each bracket (12) includes a number of bores (12',12",12''') equally spaced from the traverse (10), each arm (9) and each bail (11) having a bore in the region of the bracket bores (12',12",12'''), the arms (9) and the bails (11) being adjustable in relation to the brackets (12) by means of their bores and one of the bracket bores (12',12",12''') of each bracket by a rod passing through the bores.

* * * * *